UNITED STATES PATENT OFFICE.

JOSEPH WEISMAN, OF PHILADELPHIA, PENNSYLVANIA.

IMPROVEMENT IN THE MANUFACTURE OF STEEL.

Specification forming part of Letters Patent No. 43,443, dated July 5, 1864.

*To all whom it may concern:*

Be it known that I, JOSEPH WEISMAN, of the city of Philadelphia, in the State of Pennsylvania, have discovered and invented a new and Improved Mode of Manufacturing Steel; and I do hereby declare that the following is a full and exact description thereof, reference being had to the accompanying drawings and the letters of reference marked thereon, whereby others skilled in the art may be enabled to make use of my discovery and invention.

I use iron or fire-clay tubes. These I pass through a reverberatory furnace, the ends of the tubes protruding outside of the furnace and then luted with clay or other substance, so that when the tubes are filled with iron bars coated with or embedded in graphite (the mineral carbon through and by the agency of which the iron is to be converted into steel) the atmosphere is entirely excluded. By this mode of producing blistered steel we have full control over the heat in the furnace, which may be regulated by the dampers and the side door of the furnace and a red or white heat made uniform, with a great saving of time and fuel as compared with the old mode of making blistered steel. Another great advantage is that we can withdraw the iron or steel bars from any tube without disturbing the other tubes in the process of cementation. In the old mode of making blistered steel the time of cementation is from seven to ten days, it being necessary for the furnace to cool before the steel can be removed, and it is well known that the steel is not uniform in blister or in its cementation.

The time required to convert iron into blister-steel by my process is from forty to seventy hours, the variation of time being dependent upon the quality of steel required. If the steel in process of conversion is designed for cast-steel, a lower heat and a few hours more of time is required; but if blistered steel is required, and to be forged under the tilt-hammer, it will need less time in the cementing process and will be found to be very superior to the old or common blistered steel, and for fine cutlery will vastly excel the steel made by the mode heretofore pursued.

What I claim as my discovery is that the graphite carbon found in the regular vein of micaceous-schist formation found in the States south of the Potomac river, having a greater specific gravity, and being more compact and in greater body than other deposits of the same mineral, its electric character is also much greater than in those, and the atmosphere is more completely excluded by its density, whereby iron more readily absorbs the carbon than by the use of any other form of carbon.

The furnace may be constructed of any form adapted for the purpose, as the main requirement is a regular and uniform heat around the tubes. I take the common reverberatory furnace, with its stack and damper, with a door at the side, and the heat may be made uniform, the iron bars placed in the tubes, and when converted into steel withdrawn therefrom without disturbing the cementing process, and in this way the furnace may be operated day and night without the wear and injury incident to the old process. Several qualities of steel may be thus produced to meet the demands of manufactures in steel. The diameter and length of the tubes may be made to conform to the kind of iron or its dimensions which it is intended to convert into steel. The bars of iron may be placed in flat tubes or boxes, and before they are inserted in such flat tube a coating of the graphite carbon, mixed with water, may be applied to the bars, which will impart toughness to the steel designed for boiler-plates. The tubes may be made to revolve, if important, in the formation of any description of steel, or as the case may require. By placing the tubes vertical I have succeeded in making cast-steel by the first induction.

Having thus described my invention and the mode of carrying it into effect, what I claim as my invention, and desire to secure by Letters Patent of the United States, is—

The process herein described of making steel, which process consists in treating bars of iron in closed tubes or boxes with graphite carbon of high specific gravity, substantially as set forth.

JOSEPH WEISMAN.

Witnesses:
R. T. CAMPBELL,
E. SCHAFER.